Figure 1:
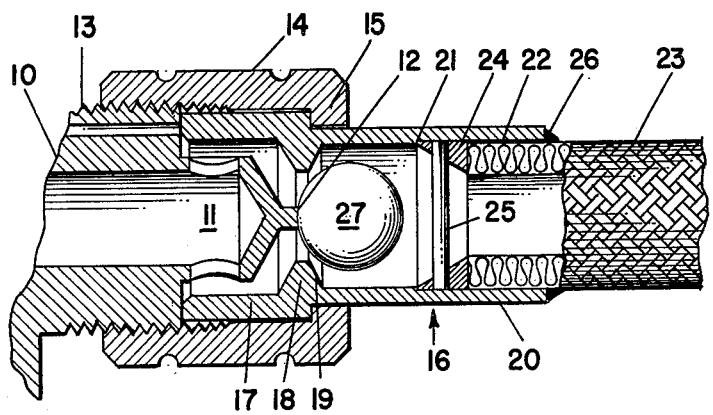

June 11, 1963  A. RODGERS ET AL  3,093,357
PRESSURIZED FLUID COUPLING MEANS
Filed Jan. 23, 1961

INVENTORS
ARTHUR RODGERS
CHARLES E. FALLIS
BY *Elliott & Pastoriza*
ATTORNEYS

United States Patent Office 3,093,357
Patented June 11, 1963

3,093,357
PRESSURIZED FLUID COUPLING MEANS
Arthur Rodgers, Northbrook, and Charles E. Fallis, Park Ridge, Ill., assignors to Fire Guard Corporation, a corporation of Illinois
Filed Jan. 23, 1961, Ser. No. 84,240
3 Claims. (Cl. 251—149.4)

This invention generally relates to pressurized fluid coupling means, and more particularly concerns improvements in the connection of a pressurized line to the end of a fluid passage, for example, a fluid discharge member.

The invention will be particularly described from the standpoint of its application to fire extinguishing systems in which a plurality of pressurized fire extenguisher tanks or cylinders are designed to be operatively connected in parallel to an extinguishing agent main line in response to a certain condition. It will be appreciated, however, that the subject matter of the present invention may be employed in other instances and applications in which a pressurized line is designed for removable coupling to some type of fluid conduit. In consequence, the particular embodiment hereafter fully described is specifically set forth only by way of illustration as one means of utilizing the present invention.

Towards this end, reference may be had to applicants' co-pending application filed July 21, 1960, under Serial No. 44,470 entitled, "Pressurized Gas Valve Unit," in which a valve construction is set forth designed for opening to connect a fluid passage from a fire extinguisher tank to a discharge outlet adapted to, in turn, communicate with a pressurized fluid line. It will be appreciated that in the event one fire extinguisher tank or cylinder must be removed from the fire extinguishing system, some means must be provided to prevent the escape of pressurized fluid from the system through the line or hose normally connected to the tank removed.

Thus, one of the primary objects of the present invention is to provide a coupling, including valve means, in a fluid line in which the valve means is designed to automatically close in response to an uncoupling of the line from the particular fitting with which it is designed to mate.

On the other hand, another object of the present invention is to provide a pressurized fluid coupling, in which a valve means is embodied therein that is designed to open automatically in response to establishment of a connection of the coupling to the fitting with which it is adapted to communicate.

A still further object of the present invention is to provide a pressurized fluid coupling in which a valve means is embodied therein which is integrally formed with a swivel connector, whereby the swivel connector co-functions both for its primary purpose and as a check valve means.

A still further object of the present invention is to provide an improved pressurized fluid coupling, which may be readily assembled and fabricated and which may be used with relatively standard fluid discharge fittings modified only to a small degree, and yet a coupling which will not require any appreciable maintenance or care over a long period of operation.

These and other objects and advantages of the present invention are generally attained by providing a nut member in the combination of a pressurized line adapted for coupling to a fluid discharge member, the nut member being designed for connection to the discharge member with cooperative means provided on the discharge member and the nut member.

A swivel connector is carried by the nut member and the swivel connector has a first portion thereof designed for rigid connection to the pressurized line and a second portion of decreased diameter to define a valve seat. A ball valve is disposed within the swivel connector on the outlet side of the valve seat, and means are connected to the discharge member for urging and maintaining the ball valve away from the seat in response to connection of the nut member to the discharge member.

In a preferred construction, means are also provided within the connector for limiting movement of the ball valve member in the direction of the pressurized line.

Figure 2:
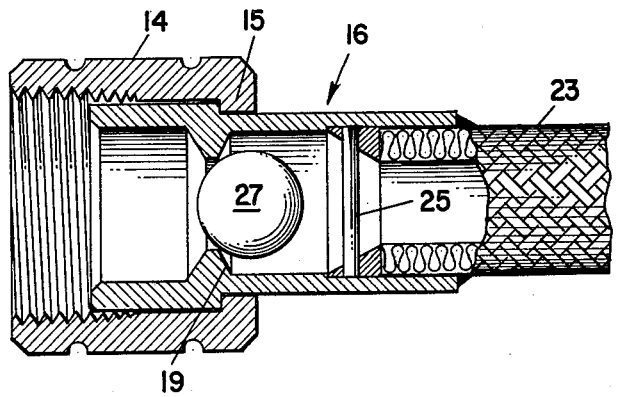

A better understanding of the improved pressurized fluid coupling of the present invention may be had by reference to the drawings, showing, as heretofore mentioned, an illustrative embodiment, and in which:

FIGURE 1 is a sectional view of the coupling connected to a discharge fitting or fluid passage means; and FIGURE 2 is a view of the coupling after removal from the discharge member.

Referring now to the drawings, there is shown in FIGURE 1 the end of a fluid passage means or conduit 10, which may also be referred to as a fluid discharge member. The fluid discharge member 10 may be the outlet of the fire extinguisher tank valve unit as described in applicants' co-pending application hereinbefore referred to.

The fluid discharge member 10 embodies a diffuser tip 11 of conventional construction which also includes a protruding member or tit 12 co-functioning as a part of the present invention.

The discharge member 10 is formed on its outer periphery with threading 13 designed to mate with threading provided on a nut member 14. The nut member 14 forms the means of establishing the coupling and embodies towards this end a decreased diameter shoulder 15 adapted to retain a swivel connector 16.

The swivel connector 16 includes an increased diameter portion 17 designed to be interposed between the shoulder 15 of the nut 14 and the end face of the discharge member 10 such that the portion 17 may swivel within the nut 14 and still maintain a metal-to-metal seal preventing escape of fluid. The swivel connector further embodies a decreased diameter portion 18 defining a valve seat 19, the function of which will be hereinafter described. The swivel connector 16 also includes an elongated tubular portion 20 having an inner shoulder 21 to define a hose retaining portion 22.

The hose retaining portion 22 of the swivel connector 16 is designed to receive therein a hose 23 or other fluid conduit. The hose 23 in the particular application being described is preferably formed of metal of a flexible construction. The inner end of the hose 23 is squared off to engage an annular retainer member 24 which abuts against the shoulder 21 and which carries a diametrically extending pin 25.

The swivel connector 16 is preferably formed of brass and may be rigidly connected to the hose 23, preferably formed of bronze, by a solder connection 26. This type of connection has been found satisfactory to withstand the 6000 pounds per square inch burst pressure specification required in this particular embodiment.

A ball valve 27 is disposed within the swivel connector 16 between the pin 25 and the protruding tit 12. In the coupled connection as shown in FIGURE 1, the ball valve 27 is forced away from the valve seat 19 by the tit 12 of the diffuser 11 forming a part of the discharge member 10. Thus, when the nut 14 is screwed onto the threading 13, it forces the swivel connector 16 against the end face of the discharge member 10, and furthermore assures that the tit 12 will protrude through the decreased diameter portion 18 to maintain the ball 27 away from the seat 19 despite a pressure in the line 23. Furthermore, in the event the pressure coming into the discharge fitting 10 exceeds the pressure in the line 23 (to thereby cause the ball valve 27 to move towards the hose 23), the ball 27 is limited in its movement towards the hose 23 by the cross pin 25.

It will be appreciated, however, that for certain reasons, recharging and maintenance, for example, the tank or cylinder to which the line 10 is connected may have to be removed from the system. In such event, the nut 14 is uncoupled or unthreaded. In the event any pressure exists in the line 23, the extinguisher agent or other gases would tend to escape out through the end of the nut 14.

In the present invention, however, the ball 27 will be forced against the seat 19 as soon as the nut 14 is disconnected, assuming any pressure exists in the line 23. Thus, the line 23 will be self-sealing in response to uncoupling of the nut 14 from the discharge member 10.

It will be appreciated, of course, that various details in the construction of the pressurized fluid coupling of the present invention may be varied without departing from the spirit and scope of the invention. For example, in the present construction, the annular retainer 24 is merely interposed between the squared end of the hose 23 and the shoulder 21 of the swivel connector 16. Since the hose 23 is firmly secured to the swivel connector 16 by the solder connection 26, the retainer 24 and pin 25 attached thereto is securely positioned within the connector 16. It will be appreciated, however, that the pin 25 could actually be formed in the hose 23 to eliminate, for example, the necessity of the retainer 24.

Such modifications and others of a comparable degree are deemed to fall within the scope of the present invention as set forth in the following claims.

What is claimed is:

1. In the combination of a pressurized line adapted for coupling to a fluid discharge member: a nut member designed for connection to said discharge member; cooperative means on said discharge member and said nut member for establishing said connection; a swivel connector carried by said nut member, said swivel connector having a first portion thereof designed for rigid connection to said pressurized line; said first portion defining an inner annular shoulder, and said swivel connector having a second portion of decreased diameter defining a valve seat; a ball valve disposed within said swivel connector on the outlet side of said valve seat; means connected to said discharge member for urging and maintaining said ball valve away from said seat in response to connection of said nut member to said discharge member; an annular retainer designed to be received within said first portion against said shoulder; and a diametrically extending pin carried by said retainer limiting movement of said ball valve in the direction of said pressurized line.

2. The combination comprising: a pressurized line designed for coupling to a fluid discharge member; a nut member designed for connection to said discharge member; cooperative means on said discharge member and said nut member for establishing said connection; a swivel connector carried by said nut member, said swivel connector having a first portion thereof designed for rigid connection to said pressurized line, said first potrion defining an inner annular shoulder, and said swivel connector having a second portion of decreased diameter defining a valve seat; a ball valve disposed within said swivel connector on the outlet side of said valve seat; means connected to said discharge member for urging and maintaining said wall valve away from said seat in response to connection of said nut member to said discharge member; an annular retainer designed to be received within said first portion against said shoulder; and a diametrically extending pin carried by said retainer limiting movement of said ball valve in the direction of said pressurized line, said pressurized line seating against the outer edge of said annular retainer.

3. The combination, according to claim 2, in which said pressurized line is formed of bronze and in which said swivel connector is formed of brass; and, a metallic bond formed therebetween.

References Cited in the file of this patent

FOREIGN PATENTS 103,806  Great Britain _____ Feb. 8, 1917